Oct. 20, 1925.  
J. A. McBRADY  
1,558,027  
AUTOMOBILE BED ATTACHMENT  
Filed Oct. 30, 1923  3 Sheets-Sheet 1

Inventor  
J. A. McBrady  
By  
*J Hauschell*  
Attorney

Oct. 20, 1925. 1,558,027
J. A. McBRADY
AUTOMOBILE BED ATTACHMENT
Filed Oct. 30, 1923 3 Sheets-Sheet 2
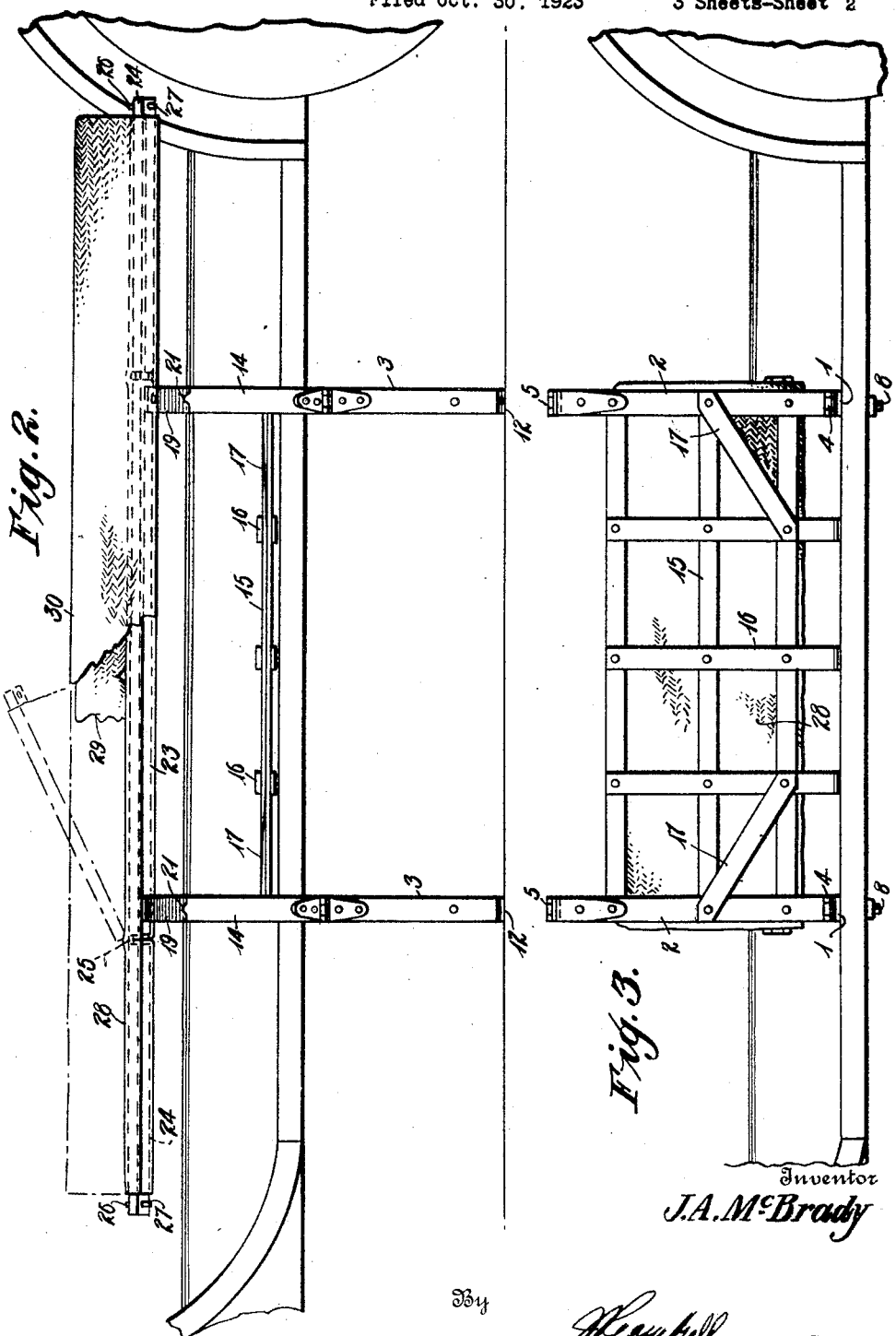
Inventor
J. A. McBrady
By
Attorney Oct. 20, 1925.

1,558,027

J. A. McBRADY

AUTOMOBILE BED ATTACHMENT

Filed Oct. 30, 1923   3 Sheets-Sheet 3

Inventor

J.A.McBrady

By

Attorney

Patented Oct. 20, 1925.

1,558,027

UNITED STATES PATENT OFFICE.

JOHN A. McBRADY, OF ST. PAUL, MINNESOTA.

AUTOMOBILE BED ATTACHMENT.

Application filed October 30, 1923. Serial No. 671,791.

*To all whom it may concern:*

Be it known that I, JOHN A. MCBRADY, a citizen of the United States, residing at St. Paul, State of Minnesota, have invented certain new and useful Improvements in Automobile Bed Attachments, of which the following is a specification.

This invention relates to automobile bed attachments and it consists in the novel features hereinafter described and claimed.

An object of the invention is to provide a bed attachment of simple and durable structure and adapted to be applied to the running board of an automobile and which may be used for sleeping or resting purposes when the machine is parked or standing and which may be folded up in small space or compass upon the running board when not in use and carried when the machine is traveling. A canopy may be used in conjunction with the bed attachment, if desired, and the said canopy may serve as a tent cover or shelter for the bed when extended and may serve to wrap about the parts of the bed when folded and prevent the accumulation of dust and dirt upon the bed attachment.

With these and other objects in view and which will be made apparent as the description of the device progresses, the bed comprises two bracket structures each consisting of an attaching section, a body section and a leg section. These sections are hingedly connected together so that they may be extended or folded up upon the running board. Fastening means are provided for securing the leg sections to the attaching sections when the parts are folded. The body sections of the two bracket structures are connected together by slats and are provided with parallel longitudinally disposed edge portions which are disposed at right angles to the intermediate portions of the said sections. A bed frame, composed of sections hingedly connected together, is hinged upon the body sections and props are provided for bracing the bed frame upon the body when the parts are extended.

A bed bottom, composed of rails consisting of sections hingedly connected together, is mounted upon the bed frame and detachable rods are provided for holding the rails of the bed bottom spaced apart when the structure is extended. A strip of canvas or other fabric material is attached to the rails and is adapted to support a mattress. The said strip is provided with a fold or flap portion which is adapted to lie upon the mattress and thus the strip serves as means for supporting and protecting the mattress. The canopy may be connected with the outer rail and the top of the automobile when the parts are extended and as hereinbefore indicated.

In the accompanying drawings—

Figure 2 is a fragmentary side elevation of an automobile with the attachment applied and extended and showing parts thereof broken away.

Figure 3 is a fragmentary side elevation of an automobile with the attachment applied and showing the same folded upon the running board.

As illustrated in the accompanying drawings the automobile bed attachment includes a pair of supporting brackets adapted to be applied to the running board of the machine and in that the said supporting brackets are alike a description of one will suffice.

Figure 5:
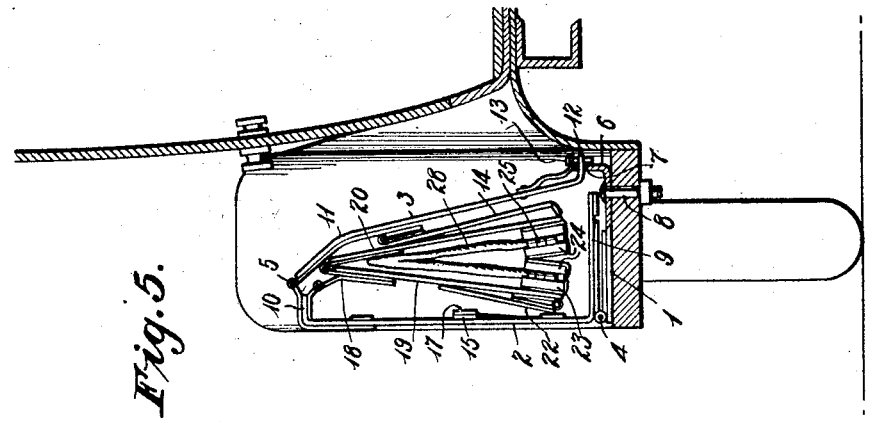
Figure 5 is a similar view showing the parts of the automobile bed attachment folded upon the running board of the automobile.
Figure 4:
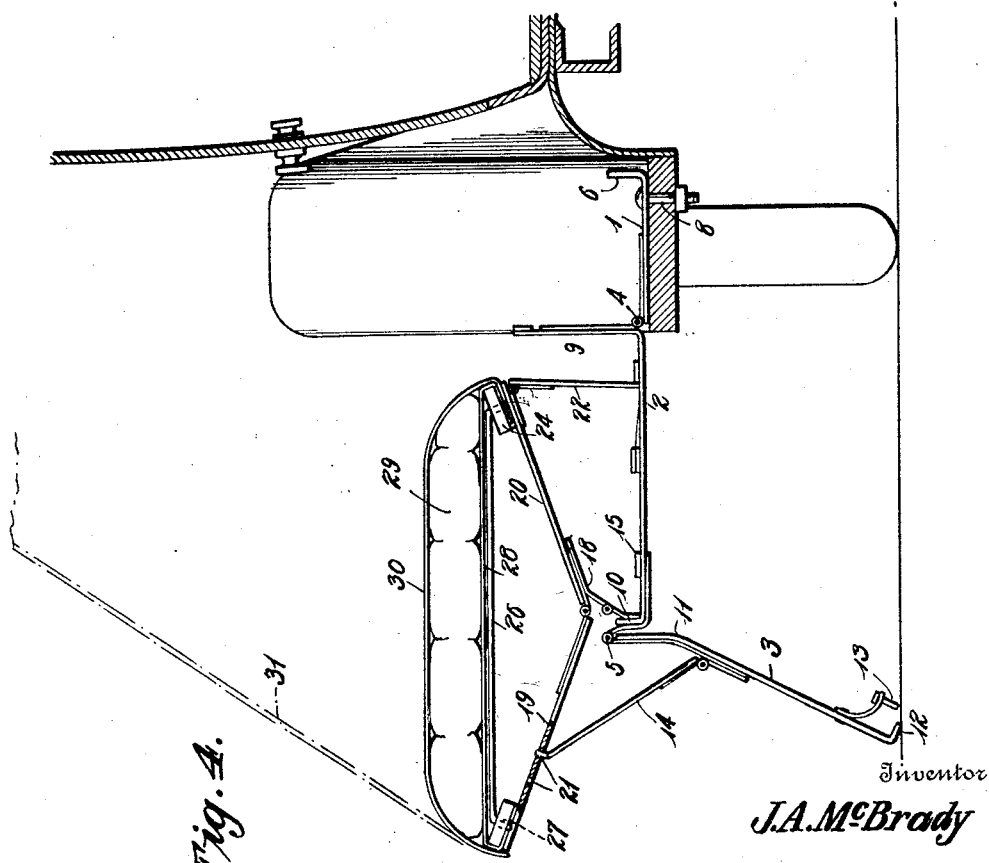
Figure 4 is a fragmentary transverse sectional view of an automobile with the attachment applied and showing the parts thereof extended.

Each supporting bracket is composed of an attaching section 1, a body section 2 and a leg section 3. The body section is connected with the attaching section by means of a hinge 4 and the body section is connected with the leg section by means of a hinge 5, so that the bracket is articulated and may be folded or extended as desired. The attaching section is provided with an angularly disposed extremity 6 having an opening 7 passing therethrough. The section 1 is attached to the running board of the machine by means of a bolt 8 which passes transversely through the section and the board as best shown in Figures 4 and 5 of the drawing. The body section 2 is provided with parallel end portions 9 and 10 which are disposed at right angles to the intermediate portion of the said section.

The portion 9 is longer than the portion 10 and the hinge 4 connects with the said portion 9 so that the pivot joint of the hinge lies adjacent the angle of the portion 19 with relation to the intermediate portion of the body section. The portion 9 may swing from a position approximately parallel to the section 1 to a position approximately vertical thereto. The leg section 3 is provided at a point between its ends with a bend 11 whereby the opposite end portions of the leg section are disposed at an angle with relation to each other. The leg section 3 is provided with an angularly disposed extremity 12 which may engage the ground when the parts are extended or which may enter the opening 7 in the extremity 6 of the section 1 when the parts are folded as shown in Figure 5.

A pin 13 is carried by the leg section 3 and may be passed through the extremity 12 when the same is inserted in the opening of the extremity 6 whereby the parts are secured in the folded or collapsed positions as shown in Figure 5. A prop 14 is hingedly connected with the intermediate portion of the leg section 3.

Figure 1:
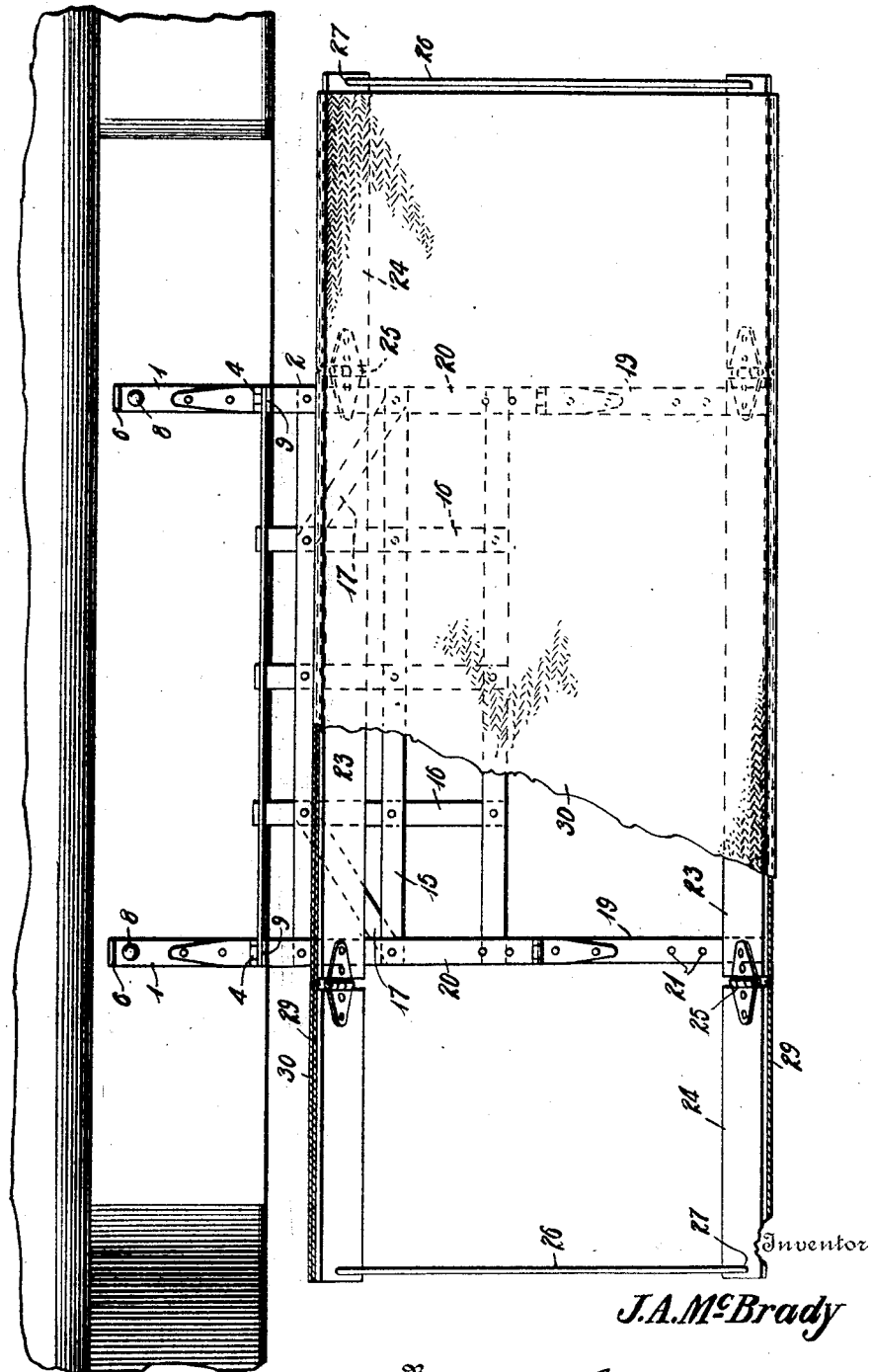
Figure 1 is a top plan view of the automobile bed attachment showing the same applied and extended and with parts broken away and parts shown in section.

Longitudinally disposed spaced slats 15 are connected with the body sections 2 of the two supporting brackets and cross slats 16 are connected with the slats 15 as best shown in Figure 1 of the drawing. Diagonally disposed braces 17 are connected with some of the slats 15 and 16 at the inner portion of the structure to hold the slats 15 and 16 in their proper angular relation with respect to each other. Y-shaped hinges 18 have leaves which are pivotally connected with the portions 10 of the body sections.

Bed frame sections 19 and 20 are mounted upon adjacent leaves of the Y-shaped hinges 18 so that the sections 19 and 20 are pivotally connected together. The sections 19 are provided with openings 21 adapted to receive the free ends of the props 14 when the parts are extended whereby the sections 19 are braced upon the leg sections 3 as shown in Figure 4. Props 22 are hingedly connected with the sections 20 and may be swung into engagement with the body sections 2 when the parts are extended and support the sections 20 as indicated in Figure 4. Rail sections 23 of the bed bottom are mounted upon the outer portions of the sections 19 and 20 and rail sections 24 are pivotally connected by means of hinges 25 with the ends of the rail sections 23. A strip of canvas 28 or other suitable fabric is attached to the rail sections 23 and 24 and may support a mattress 29. The mattress may be the cushion seats used in the automobile. The strip 28 is provided with a folded flap 30 which may lie over and upon the mattress and serve as a sheet or cover. Detachable rods 26 are provided with angularly disposed ends 27 which enter openings in the free ends of the rail sections 24 and hold the bed frame and the bed bottom extended. A tent fly, indicated in dotted lines at 31 in Figure 4 of the drawing, may be connected with the top of the automobile machine to which the attachment is applied and connected with the outer rail section 23 and the sections 24 when the parts are extended and thus serve as a canopy for the bed when in use for sleeping purposes.

The relative positions of the parts when the structure is extended is best shown in Figure 4 of the drawing and in Figure 5 the parts are shown in folded or collapsed positions and with the mattress removed.

From the foregoing description taken in conjunction with the accompanying drawings it will be seen that an automobile bed attachment of simple and durable structure is provided and that the same may be easily and quickly set up or extended and readily folded upon the running board of the machine and when in folded position does not interfere with the operation of movement of the machine.

Minor changes or variations in proportions of the parts of the structure may be resorted to without departing from the spirit of the invention as claimed.

Having described the invention what is claimed is—

1. An automobile bed attachment comprising foldable supporting brackets attached to the running board of the automobile and adapted to be either folded up upon the running board or extended outwardly therefrom, said brackets including attaching sections and leg sections, a collapsible bed frame carried by the said brackets and positioned thereon so as to be enfolded between the said leg sections and the attaching sections when the latter are folded up upon the running board, said attaching sections having upstanding extremities provided with openings and said leg sections having angularly disposed apertured ends adapted to penetrate the said openings when the brackets are folded, and a locking pin carried by each leg section for insertion in the aperture of the said angular end of the latter when the same has penetrated the said opening.

2. An automobile bed attachment comprising foldable supporting brackets carried on the running board of an automobile and including leg sections, hingedly connected bed frame sections mounted on the said brackets, rails mounted adjacent the outer portions of the said bed frame sections, a fabric sheet connecting the said rails, detachable rods engaged with the said rails for holding the said bed frame sections spread apart at their outer portions, and means for propping up each of the said bed frame sections from the under sides thereof.

3. An automobile bed attachment comprising a pair of foldable supporting brackets mounted on the running board of an automobile in relatively spaced apart relation, each of said brackets including an attaching section—a leg section—and an intermediate section hingedly connected together so that the leg section is foldable back to engage with the attaching section, a foldable bed frame of pivoted sections pivoted on the said intermediate sections of the brackets so as to be enfolded by all three sections of each bracket when the latter is folded upon the running board, a foldable bed bottom supported by the said pivoted sections of the bed frame and adapted when folded to lie between the said bed frame sections, and means for locking the said leg sections of the brackets to the said attaching sections of the latter.

4. An automobile bed attachment comprising a foldable bracket formed of an attaching section—a leg section—and an intermediate section—hingedly connected together so that the leg section is foldable back for interlocking engagement with the attaching section, a foldable bed frame of pivoted sections pivotally connected to the said intermediate section of the bracket so as to be enfolded by all three sections of the bracket when the said leg sections is engaged with the attaching section, a hingedly mounted prop carried by one of the said bed frame sections and adapted to be swung into engagement with the intermediate section of the bracket for supporting the said bed frame section in extended position above the latter, and a hingedly mounted prop carried by the said leg section of the bracket and adapted to be swung upwardly into engagement with the other bed frame section for supporting the latter in its extended position.

5. An automobile bed attachment comprising a foldable supporting bracket formed of an attaching section—a leg section—and an intermediate section—hingedly connected together so that the leg section is foldable back for interlocking engagement with the attaching section, a foldable bed frame of pivoted sections pivotally connected to the said intermediate section so as to be enfolded within all three sections of the bracket when the said leg section is engaged with the attaching section, one of said bed frame sections being perforated to provide a plurality of openings therein, a hingedly mounted prop carried by the said leg section of the bracket and adapted to be engaged with any one of the openings of the said perforated bed frame section for supporting the latter in its extended position, and a hingedly mounted prop carried by the other bed frame section and adapted to be swung into engagement with the said intermediate section.

In testimony whereof I affix my signature.

JOHN A. McBRADY.